July 16, 1968  L. E. HOLLANDER, JR  3,392,576
SEMICONDUCTOR TRANSDUCERS
Filed Oct. 27, 1965  2 Sheets-Sheet 1

LEWIS E. HOLLANDER, JR.
INVENTOR.
BY
ATTORNEY

July 16, 1968     L. E. HOLLANDER, JR     3,392,576
SEMICONDUCTOR TRANSDUCERS
Filed Oct. 27, 1965     2 Sheets-Sheet 2
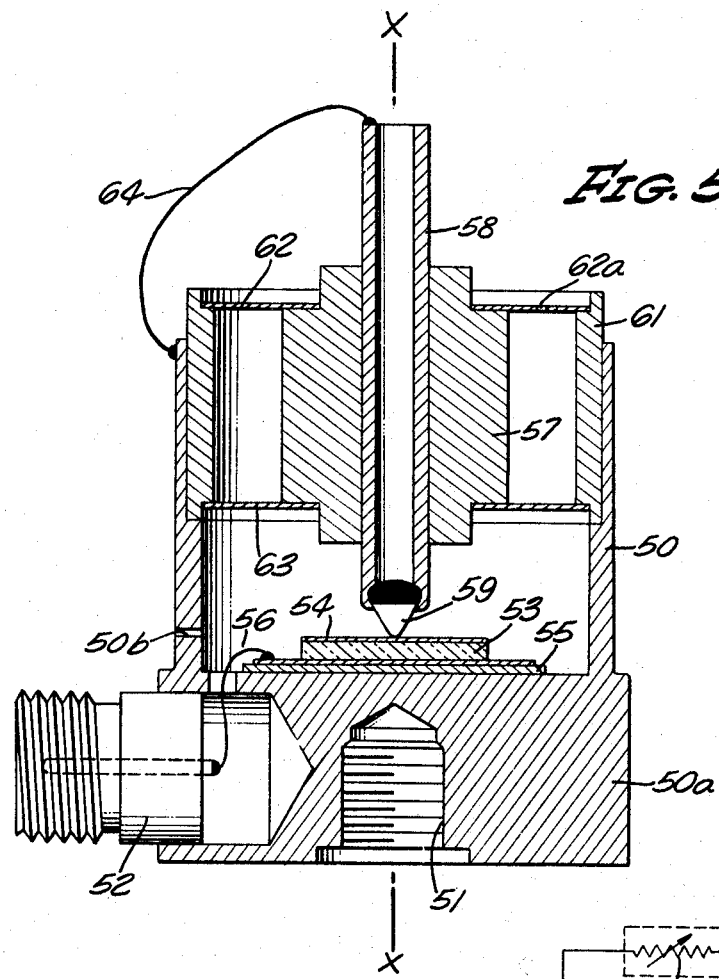
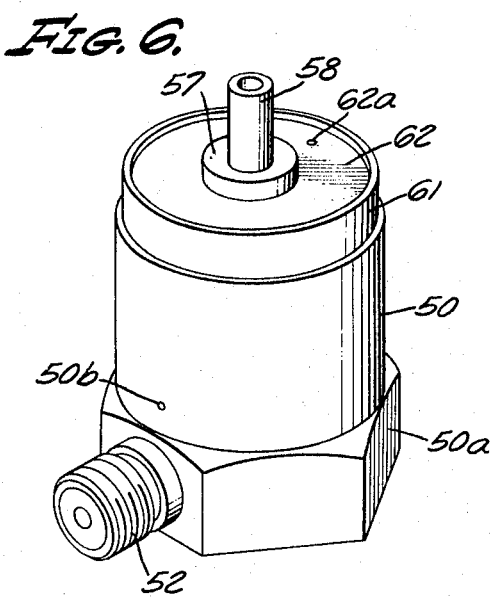
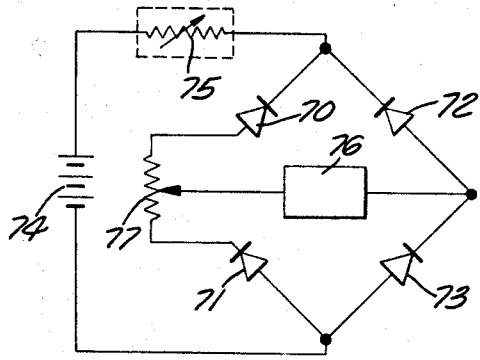
LEWIS E. HOLLANDER, JR.
INVENTOR.
BY
ATTORNEY

United States Patent Office 3,392,576
Patented July 16, 1968

3,392,576
SEMICONDUCTOR TRANSDUCERS
Lewis E. Hollander, Jr., Los Altos, Calif., assignor to Endevco Corporation, Pasadena, Calif., a corporation of California
Filed Oct. 27, 1965, Ser. No. 505,349
20 Claims. (Cl. 73—141)

ABSTRACT OF THE DISCLOSURE

The transducer of this invention employs a semiconductor element, a thin insulator, and a contact member bearing thereon with a prestressing pressure. The resistance between the semiconductor element and the contact member varies as a linear function of a force applied between the semiconductor element and the contact member. A gauge factor of the order of 1,000 is obtainable.

---

This application relates to transducers of a type in which the application of force to an element thereof results in a change in an electrical characteristic of the element. More particularly, the invention relates to a novel transducer embodying an extremely hard semiconductor element, a thin insulator layer, and a comparably hard metallic conductor, in a structure whose electrical characteristics are changed by the application of force to the transducer.

Transducers in which an electrical characteristic of the transducer varies with the application of force to the transducer are well known in the art. For example, in the well-known wire strain gauge, a change of dimension of the gauge caused by strain results in a change in its resistance. More recently, piezoresistive semiconductor materials have been employed as transducer elements. Such elements consist of bars of semiconductor material which are strained, thus resulting in large changes in resistance. Even more recently, specially prepared junction-type semiconductor devices consisting of p-n junctions and p-n-p and n-p-n junctions have been strained with a resulting change in their electrical characteristics. Such devices have been employed in numerous transducer applications. The conventional wire strain gauges are very stable, reliable and reproducible, but have very low sensitivity. Piezoresistance devices have greater sensitivity, have greater noise and are more temperature dependent. The junction type devices have very short operating ranges, are generally unreliable and extremely nonlinear, and are very temperature dependent, but they do exhibit very high sensitivities just prior to breakage.

A quantity known as the gauge factor is often used as a measure of sensitivity of a transducer. The gauge factor (GF) is defined by the following equation:

$$GF = \frac{\Delta R}{RS}$$

in which $\Delta R$ is the fractional change of resistance, $R$ is the resistance of the element, and $S$ is the strain of the element. Wire strain gauges have very low gauge factors of the order of 1–3. Semiconductor transducers, in contrast, have gauge factors running as high as 100–200. Still, such gauge factors are relatively low. A serious disadvantage of such devices is that their gauge factors vary widely with the temperature at which the device operates.

Accordingly, a primary object of the present invention is to provide a transducer having a high gauge factor, which is relatively insensitive to temperature changes and is linear with applied force.

The present invention attains the foregoing objective by utilizing as the active element in a pressure-sensitive transducer a device comprising a body of semiconductor material, a very thin insulating coating bonded to one surface of the semiconductor element, and a metallic contact which bears against the insulating coating. Generally, the semiconductor material has been silicon or silicon carbide and the insulating coating has been a very thin layer of oxide thermally grown or otherwise deposited on one surface of the semiconductor body. Such a device, which is known as a metal-oxide-semiconductor (MOS) device, acts as a diode in that it has unidirectional current conducting characteristics. When used as a diode, the MOS device freely conducts current (conventional flow direction) from the semiconductor material through the oxide coating to the metallic contact, but does not conduct current easily in the opposite direction. It has now been discovered that if an MOS device is electrically biased in the direction of nonconduction, that is, biased in a direction to tend to cause current to flow from the metallic contact through the oxide coating and through the semiconductor material, varying a physical force applied to the device causes a change in the amount of reverse current flowing through the MOS device.

The amount of reverse current varies virtually linearly with respect to applied pressure after a certain amount of pressure has been applied. Therefore, in the best embodiment of the invention, the device is mechanically biased, that is, precompressed, so that the reverse current varies linearly with pressure over the entire operating range of the device.

It has been found that when such an element is employed as the active element in a transducer, it has a gauge factor of the order of 1,000, an order of magnitude greater than any gauge factor previously attainable with conventional devices. Furthermore, the gauge factor is virtually constant over a very wide range of temperatures, and sensitivity is linear with applied strain over a wide range of applied strains.

Further features and advantages of the invention will become apparent from the following description, taken in conjunction with the accompanying drawings, in which:

FIG. 5 is a diagrammatic sectional view of an accelerometer embodying the invention;

FIG. 6 is a perspective view of the accelerometer of FIG. 5; and

FIG. 7 is a schematic diagram of an electrical circuit in which the transducer may be connected.

It is pointed out that an MOS device also exhibits force sensitivity when conducting current in a forward direction as well as in a reverse direction. However, because less current flows when the device is used with reverse-direction current flow, that mode of operation is considered best, and the following description considers primarily that mode of operation.

Figure 1:
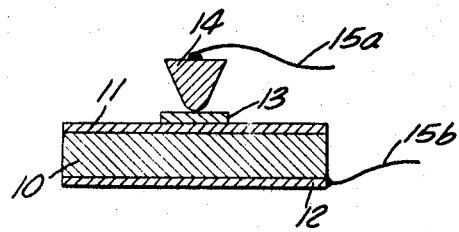
FIGURE 1 is a diagrammatic sectional view of an MOS diode known in the prior art.

FIG. 1 illustrates an MOS diode of the type known in the prior art. The diode comprises a wafer of semiconductor material 10 which is generally silicon or germanium. The wafer of semiconductor material 10 is provided with a very thin insulating coating 11, which may conveniently be an oxide, sulfide, nitride, etc., on one surface thereof and the other surface carries a metallic electrode 12 such as aluminum. A small dot of aluminum 13 is deposited on the coating 11 and a metallic contact 14 having a relatively sharp point bears against a small area on the upper surface of the aluminum dot 13. The dot 13 is only slightly larger than the area which is contacted by the contact 14. Conductors 15a and 15b are connected to the contact 14 and to the aluminum electrode 12, respectively. It is pointed out that the thicknesses of the insulating layer 11 and the electrode 12 are greatly exaggerated for purposes of illustration. In actuality, both are extremely thin, the layer 11 being typically of the order of 300–500 A. (Angstrom units) thick and the electrode 12 being merely a coating evaporated onto the surface of the semiconductor device.

It is customary in a diode of the type shown in FIG. 1 to so construct the housing or container of the diode that a definite predetermined force is exerted by the contact 14 through the aluminum pad 13 on the insulating coating 11. The theory of operation of such a device as a diode is not thoroughly understood. However, it is known that such a diode will freely conduct current in the forward direction, that is, in the direction from the conductor 15b to the conductor 15a, but will not conduct current easily in the reverse direction.

The present invention is based on the discovery that current can be conducted in the reverse direction through a back-biased diode, that is, from the conductor 15a to the conductor 15b if sufficient force is exerted by the contact 14 on the insulating coating 11. Furthermore, the amount of current that flows varies with the force exerted by the contact 14 on the coating 11. The back bias is below the breakdown voltage.

Figure 2:
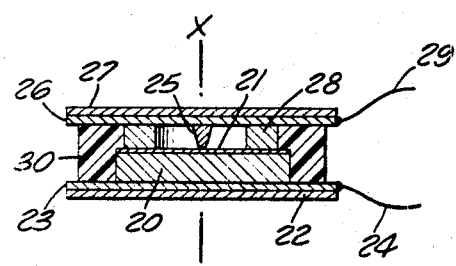
FIG. 2 is a diagrammatic sectional view of a pressure transducer constructed in accordance with the teachings of the invention.

FIG. 2 illustrates, in simplified form, a pressure-sensitive transducer constructed in accordance with the teachings of the invention. As seen in the figure, the active element comprises a wafer of semiconductor material 20 provided on its upper surface with an insulating coating 21. Although the invention is in no way limited to the use of the specific materials referred to herein, the semiconductor wafer 20 will generally be silicon or silicon carbide, the latter being better because of its hardness, and the insulating coating 21 generally being an oxide or oxides of silicon which can be conveniently thermally grown or otherwise deposited on the silicon or silicon carbide semiconductor wafer.

A molybdenum disc 22 having an aluminum coating 23 on its upper surface is secured to the bottom surface of the wafer 20 to act as one electrode for the device, and a conductor 24 is electrically connected to the aluminized surface of the molybdenum disc.

Electrical and physical contact with the insulating coating 21 is made by a titanium carbide contact 25, which is electrically connected to an aluminum coating 26 deposited on the lower surface of a molybdenum disc 27. The disc 27 is spaced from the insulating coating 21 on the semiconductor element 20 by means of a hard insulating spacer 28 made of a material such as zircon. A conductor 29 is electrically connected to the aluminum coating 26, and conventional potting compound 30 is used to fill the space around the semiconductor wafer 20 and the spacer 28 to form a unitary body.

The material of which the semiconductor wafer 20 is made may be any conventional material used in the construction of MOS diodes. Both silicon and silicon carbide crystals are suitable materials and, of these two, silicon carbide is the better because it is considerably harder than silicon and hence will withstand more physical force without breaking. Silicon carbide crystals now available vary in size from 2–3 mm. to 15–20 mm. across and are from 0.1 mm. to 1.0 mm. thick and have a hardness value of about 2480 as measured on Knoop's scale. The material of which the contact 25 is made is also not critical, although it was previously stated that it is made of titanium carbide. That material is particularly useful because of its extreme hardness (approximately 2470 on Knoop's scale). Of course, the contact 25 must be an electrical conductor. Preferably the contact 25 and the semiconductor wafer 20 are of substantially equal hardnesses and considerably harder than the insulating layer 21. It has been found to be satisfactory if the hardnesses of the contact and semiconductor are in a range of 10:1 to 2:1 with respect to the hardness of the insulating layer, as measured on Knoop's scale. It has also been found that as the insulating layer becomes softer, the sensitivity of the device increases, but its response to applied force of higher frequencies decreases. Therefore, a balance must be obtained whereby both sensitivity and response to forces of various frequencies are satisfactory.

It is noted that the molybdenum discs 22 and 27, the zircon spacer 28, the semiconductor wafer 20, and the tungsten carbide contact 25 all have approximately the same coefficients of thermal expansion. This is important when the device is to be used at various temperatures.

It is also pointed out that aluminized sapphire may be used as the contact 25. In practice, it has been found that a conventional sapphire record player needle of the type designed for playing microgroove, 33⅓ revolutions per minute, records is very satisfactory. It, of course, is quite hard and has a rounded point having a radius of approximately 8–9 microns which bears against the insulating coating 21. Such a needle, of course, must be aluminized or otherwise treated to render it conducting.

If the insulating coating 21 is silicon dioxide, which is preferred, its thickness is somewhat critical. It has been found that it should be less than approximately 2000 A. thick and more than approximately 50 A. thick, although its thickness is greatly exaggerated in the drawing. Of course, if the coating is too thin it will have a tendency to have pinholes that cause it to break down under an applied back-bias of a desired voltage. It has been found in practice that a coating approximately 200 A.–300 A. thick is quite satisfactory.

The silicon dioxide coating may be thermally grown on the semiconductor element or it may be deposited thereon by other techniques such as evaporation. A technique by which the silicon dioxide can be thermally grown involves heating the semiconductor wafer at 1000° C. in a steam atmosphere for approximately 50 minutes, or similarly heating it in dry oxygen at 1300–1400° C. Such techniques are well known in the art.

Various known techniques may be utilized to measure the thickness of the oxide coating. For example, a technique of using interference fringes to determine the thickness of the coating is described in a paper entitled, "Measurement of Oxide Films on Silicon," by G. R. Booker and C. E. Benjamin, published in the Journal of the Electro-Chemical Society, vol. 109 (1962), starting at page 1206. The increase in weight of the element as measured with a microbalance technique may be used as an indication of the thickness of the oxide layer.

It was previously noted in connection with the description of the device shown in FIG. 2 that a layer of aluminum 23 is deposited on the molybdenum disc 22 and a similar layer of aluminum 26 is deposited on the disc 27. In such a case the semiconductor wafer 20 will generally be of the p-type. In the event that the semiconductor is n-type, nickel, rather than aluminum, would conventionally be used for the conductive layers 23 and 26. Either p-type or n-type semiconductor devices may be utilized in the transducer of the invention. However, inasmuch as p-type devices have a higher breakdown voltage in the reverse direction, they are preferable to n-type. For example, for a given thickness of its oxide layer, a p-type silicon device has a reverse breakdown voltage of approximately 20 volts, whereas an n-type silicon device typically has a reverse breakdown voltage of approximately 2 volts for the same thickness of oxide layer. Thus, the p-type device is best for obtaining a larger output signal.

Figure 3:
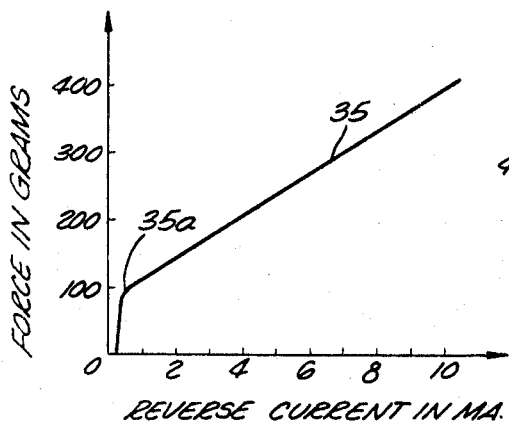
FIG. 3 is a graph useful in understanding the operation of the invention.

FIG. 3 is a graph representing the manner in which the reverse current through a device, such as that shown in FIG. 2, varies as a function of force applied along the axis X—X shown in FIG. 2. It will be noted from FIG. 3 that the curve 35 shown therein is essentially linear beyond a knee 35a which is reached when a force of approximately 100 grams is applied to the transducer. Therefore, for best effects the device is operated above the knee 35a. This can be attained by pre-compressing the device. The spacer 28 may be made of such thickness that sufficient force is exerted by the contact 25 on the oxide layer 21 in the absence of externally applied force to pre-compress or mechanically bias the device so that it will operate the knee 35a of the curve.

The theory of operation of MOS devices as transducers is not thoroughly understood at the present time. However, it is believed that the interface between the oxide and the semiconductor gives rise to an accumulation of a free negative charge at that interface. As a result, an electric field exists in the oxide, and the magnitude of that field determines the diode characteristics of the device. The silicon oxide acts as an insulator and presents a barrier to the flow of charge carriers. By the application of stress sufficient to deform the oxide insulator layer, the charge barrier is neutralized, thus resulting in symmetrical conduction. As shown in FIG. 3, that conduction is very nearly a linear function of the applied force above a certain amount. It has also been found that a device such as that shown in FIG. 2 has a gauge factor of approximately 1,000 if constructed of silicon and a gauge factor of approximately 800 if constructed of silicon carbide. Furthermore, the gauge factor of a silicon carbide device is essentially constant over a temperature range of from 100° F. to 1000° F.

Figure 4:
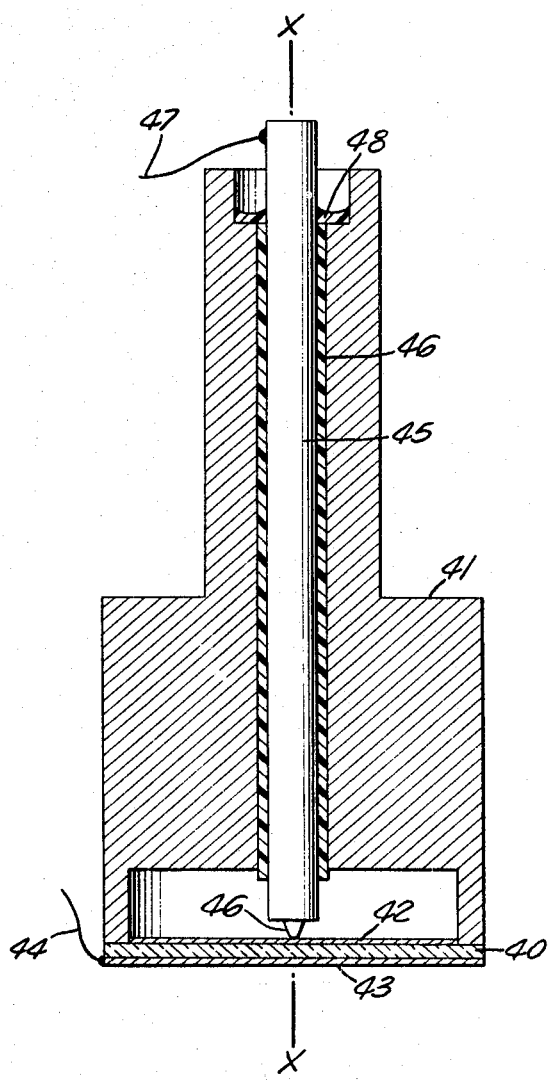
FIG. 4 is a diagrammatic sectional view of another pressure transducer embodying the invention.

FIG. 4 diagrammatically illustrates another form of pressure transducer embodying the invention. As shown, a semiconductor element in the form of a diaphragm 40 is mounted across an end of a hollow cylindrical housing 41. The diaphragm 40 is provided on its surface adjacent the housing 41 with an insulating coating 42 and on its other surface with an electrode 43 to which a conductor 44 is electrically connected. Again, the insulating coating and the electrode are shown with exaggerated thicknesses. The semiconductor diaphragm 40, which may be a silicon or silicon carbide crystal, may be soldered to the housing 41 with gold-silicon solder. The insulating layer 42 may conveniently be silicon dioxide of the thickness previously described, and the electrode 43 may be either nickel or aluminum (depending on whether the semiconductor device is n-type or p-type), evaporated or otherwise deposited on the semiconductor diaphragm.

Extending along the axis of the housing 41 is a round conductive shaft 45 having a contact 46 secured by conventional means to its lower end, which contact bears against the insulating coating 42. The contact 42 may be made of one of the materials previously discussed, and the shaft 45 is preferably made of steel. The shaft 45 is surrounded by a sleeve 46 of insulating material and an electrical conductor 47 is connected to the shaft 45. After the precompression of the transducer has been adjusted (to cause operation above the knee of the curve as shown in FIG. 3), conventional potting compound 48 is poured into the upper end of the housing around the shaft 45 to seal the unit.

The pressure transducer shown in FIG. 4 operates in essentially the same manner as the transducer described with reference to FIG. 2, except that it is designed for pressure to be applied to the diaphragm rather than to the contact. If an external force is applied to the semiconductor diaphragm 40, it bows the diaphragm and causes the pressure between the contact 46 and the insulating layer 42 to vary and thus changes the resistance of the MOS element of the transducer.

FIGS. 5 and 6 illustrate an accelerometer embodying the invention. The accelerometer comprises a housing 50 made of a suitable metal such as stainless steel and having a threaded bore 51 by means of which it may be attached to an object whose acceleration it is desired to measure. The housing 50 is hollow at its upper end and has a relatively thick base portion 50a in which is mounted a standard coaxial electrical connector 52. On top of the base 50a inside the hollow housing is mounted a semiconductor element 53 having an insulating coating 54 on its upper surface. The semiconductor element 53 and the coating 54 may be made of the materials previously described and discussed. The semiconductor element 53 is electrically insulated from the housing 50 by being mounted on a suitable pad 55 of insulating material such as alumina. The semiconductor element may be secured to the pad by suitable means such as indium solder or gold-tantalum solder. A conductor 56 electrically connects the semiconductor element 53 to the inner conductor of the connector 52.

Variable pressure is exerted on the insulating coating 54 in response to movement of the accelerometer along the axis X—X (FIG. 5) by means of an inertia mass 57 acting through a tube or shaft 58 to which it is secured and through an electrically conductive contact 59 secured to the bottom end of the shaft 58. The shaft 58 is made of an electrically conductive material such as steel. The mass 57 is secured to the shaft 58 by conventional means such as soldering and the contact 59 may similarly be soldered to the bottom end of the shaft 58. The mass 57 is supported from the housing 50 by means of a bushing 61 and a pair of flexible diaphragms 62 and 63. The diaphragms 62 and 63 may conveniently be made of very thin brass sheets (for example, .0016" thick) to provide for movement of the inertia mass 57 in both directions along the axis X—X shown in FIG. 5. Of course, the diaphragms are secured to the mass by conventional means such as soldering and are similarly secured to the bushing 61 which in turn is secured to the housing 50. In order to relieve any pressure that might be created inside the accelerometer, a vent hole 50b is provided through the side of the housing 50 and another vent hole 62a is provided through the diaphragm 62. A conductor 64 electrically connects the shaft 58 to the housing 50, which is electrically connected to the outer conductor of the connector 52.

The accelerometer shown in FIGS. 5 and 6 operates in much the same way as the transducers shown in FIGS. 2 and 4 except that the pressure between the insulating coating 54 and the contact 59 is produced by acceleration of the inertia mass 57 rather than by an external force. In order to provide response to acceleration of the accelerometer in both directions along the X—X axis (as seen in FIG. 5), it is desirable to prestress the accelerometer so that it is operating at a point approximately midway along the linear portion of the curve shown in FIG. 3. This can conveniently be done by adjusting the length of the bushing 61 or by adjusting the position of the shaft 58 with respect to the mass 57 prior to securing them together.

In operation, as the accelerometer is accelerated upwardly as seen in FIG. 5, due to its inertia, the mass 57 increases the pressure exerted by the contact 59 on the insulating coating 54 and decreases the resistance of the MOS device. Conversely, if the accelerometer is accelerated in a downward direction, the inertia of the mass 57 decreases the pressure between the contact and the insulating coating and thus the resistance of the MOS device is increased. Thus, if the device is back-biased electrically, acceleration in a downward direction will decrease the current through the device whereas acceleration in an upward direction will increase the current. Of course, the accelerometer has a natural mechanical resonant frequency and it should be operated at frequencies below that resonant frequency.

An accepted figure of merit for accelerometer is the product of frequency-squared times sensitivity. The best piezoresistive accelerometers heretofore known have had such a figure of merit of the order of $4.3 \times 10^4$, while an accelerometer embodying the present invention has such a figure at least an order of magnitude greater.

Although various electrical circuits may be employed for measuring the change in current flowing through the transducer of the invention, a typical one which serves satisfactorily is the bridge circuit shown in FIG. 7. As shown, the bridge comprises four arms, each including an MOS device, the MOS devices being designated 70, 71, 72 and 73. Depending upon the particular application, one or more of the MOS devices 70–73, may be active. That is, one or more of them may be acting as a transducer while the others are acting merely as balancing elements in the bridge. A source 74 of direct potential is connected through a thermistor 75 across one diagonal of the bridge to back-bias all the MOS devices electrically, and a recording or indicating means 76 is connected across the other diagonal of the bridge for indicating the flow of current through the one or more active elements. The amount of electrical back-bias provided across the elements 70–73 is governed by their reverse breakdown voltages. In order to initially adjust the bridge, a balancing potentiometer 77 is connected between the devices 70 and 71, with the movable arm of the potentiometer being connected to the indicating means 76.

The operation of the bridge circuits such as that shown in FIG. 7 is well known in the art and a detailed explanation of that operation is not believed to be necessary. Suffice it to say that if the bridge is initially balanced under no-load conditions on the one or more active elements, by adjustment of the potentiometer 77 so that no voltage appears across the indicating means 76, and the resistance of one or more of the MOS devices 70–73 changes in response to pressure being exerted thereon, the bridge will be unbalanced and that unbalance will be observed on the indicating means 76. The thermistor 75 provides temperature compensation for any shift in the impedance of the bridge due to ambient temperature changes.

It is pointed out that the input impedance of the indicating means 76 should be large compared to the impedances of the diodes 70–73 so as not to load the bridge significantly. Bridge circuits for such indications as are here required are described in a book entitled "Strain Gauge Primer," by Perry and Lissner, published by McGraw-Hill Book Company, Inc. (1962), and one entitled "Semiconductor and Conventional Strain Gages," by Dean and Douglas, published by Academic Press. Thus, no further description of such bridge circuits is believed necessary. Of course, circuits other than bridge circuits, which take advantage of the variable electrical characteristics of the MOS device could be used.

It is now apparent that the invention provides a transducer that fulfills the stated objective. It has a very high gauge factor which is relatively insensitive to temperature variations over a wide range of temperatures, is of very small size and light in weight, and perhaps most important, its response is substantially linear with applied force.

Although several embodiments of the invention have been illustrated and described, it is to be understood that many variations may be made therein by one skilled in the art, without departing from the scope of the invention.

The invention claimed is:
1. A transducer system comprising:
a semiconductor element;
an insulating coating applied to a surface of said semiconductor element;
electrical contact means in contact with said insulating coating;
said semiconductor element and said electrical contact means being arranged for variable force to be applied between said contact means and said insulating coating;
means applying a direct potential across said semiconductor element and said insulating coating in a direction to cause a variable current to flow therethrough in response to such variable force; and
means for indicating said variable current.

2. The transducer defined by claim 1, wherein said semiconductor element and said electrical contact means are of substantially equal hardness and at least twice as hard as said insulating coating, as measured on Knoop's scale.

3. The transducer defined by claim 1, including means for precompressing said contact means and said insulating coating.

4. The transducer defined by claim 1, wherein said semiconductor element is silicon carbide.

5. The transducer defined by claim 4, wherein said insulating coating is an oxide of silicon.

6. The transducer defined by claim 5, wherein said electrical contact means comprises titanium carbide.

7. A transducer system comprising:
a semiconductor element having a first hardness value, as measured on Knoop's scale;
an insulating coating applied to a surface of said semiconductor element and having a second hardness value less than half said first hardness value as measured on Knoop's scale;
electrical contact means in contact with said insulating coating and having a third hardness value substantially equal to said first hardness value;
means for applying variable force to said contact means to force said contact means against said insulating coating;
means applying a direct potential across said semiconductor element and said insulating coating in a direction to cause a variable reverse current to flow therethrough in response to such variable force; and
means for indicating said reverse current.

8. The transducer defined by claim 7, including means for precompressing said contact means and said insulating coating.

9. The transducer defined by claim 7, wherein said semiconductor element is silicon carbide.

10. The transducer defined by claim 7, wherein said insulating coating is an oxide.

11. The transducer defined by claim 9, wherein said electrical contact means comprises titanium carbide, and said insulating coating is an oxide of silicon.

12. In a transducer:
a semiconductor element having a first hardness value, as measured on Knoop's scale;
an insulating coating applied to a surface of said semiconductor element and having a second hardness value less than half said first hardness value as measured on Knoop's scale;
electrical contact means in contact with said insulating coating and having a third hardness value substantially equal to said first hardness value; and
means for varying the pressure with which said contact means bears on said coating whereby the electrical resistance between said contact means and said semiconductor element varies in a corresponding manner.

13. The combination defined by claim 12, wherein said semiconductor element is silicon carbide, and said insulating layer is an oxide of silicon.

14. The combination defined by claim 13, wherein said electrical contact means is titanium carbide.

15. A transducer comprising:
support means;
a diaphragm comprising a semiconductor element secured at its edges to said support means and arranged to bow in response to force exerted thereon;
an insulating coating applied to a surface of said semiconductor element; and electrical contact means supported by said support means and in contact with said insulating coating whereby the electrical resistance between said contact means and said semiconductor element varies as a function of the amount of bowing of said semiconductor element.

16. The transducer defined by claim 15, wherein said insulating coating is an oxide.

17. The transducer defined by claim 15, wherein said semiconductor element is silicon, said insulating coating is an oxide of silicon, and said electrical contact means comprises an aluminized material.

18. A transducer comprising:
support means having an axis;
a semiconductor element supported by said support means and having a surface disposed transversely to said axis;
an insulating coating applied to said surface of said semiconductor element;
electrical contact means located substantially on said axis and in contact with said insulating coating for exerting force thereon; and
means including an inertia member secured to said contact means and supported within said support means for movement along said axis;
said inertia member being responsive to acceleration of said support means to vary the force on said insulating coating by an amount substantially proportional to said acceleration whereby the electrical resistance between said contact means and said semiconductor element varies as a function of said acceleration.

19. The transducer defined by claim 18, wherein said inertia mass is supported from said support means by means of flexible diaphragms and surrounds a portion of said contact means.

20. The transducer defined by claim 18, wherein said semiconductor element is silicon carbide, said insulating coating is an oxide of silicon, and said electrical contact means comprises titanium carbide.

References Cited

UNITED STATES PATENTS

| 2,411,401 | 11/1946 | Welch | 73—517 XR |
| 2,478,223 | 8/1949 | Argabrite | 73—133 XR |
| 2,929,885 | 3/1960 | Mueller | 73—885 XR |
| 3,204,159 | 8/1965 | Bramley et al. | 317—238 |
| 3,274,828 | 9/1966 | Pulvari | 73—141 |

FOREIGN PATENTS 700,611  12/1940  Germany.

RICHARD C. QUEISSER, *Primary Examiner.*

C. A. RUEHL, *Assistant Examiner.*